United States Patent [19]

Crass et al.

[11] Patent Number: 4,925,728

[45] Date of Patent: May 15, 1990

[54] MULTILAYER FILM SUITABLE AS A RELEASE SHEET IN THE PRODUCTION OF DECORATIVE LAMINATE PANELS

[75] Inventors: Guenther Crass, Taunusstein; Lothar Bothe, Mainz-Gonsenheim; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 95,449

[22] Filed: Sep. 11, 1987

[30] Foreign Application Priority Data

Sep. 13, 1986 [DE] Fed. Rep. of Germany ....... 3631232

[51] Int. Cl.$^5$ .......................... B32B 27/08; B29D 7/00; C09J 7/02
[52] U.S. Cl. ..................................... 428/216; 428/330; 428/331; 428/349; 428/447; 428/516; 428/543; 264/176.1
[58] Field of Search ............... 428/216, 349, 447, 331, 428/330, 516

[56] References Cited

U.S. PATENT DOCUMENTS

| | | | |
|---|---|---|---|
| 4,303,708 | 12/1981 | Gebhardt et al. | 428/35 |
| 4,367,511 | 1/1983 | Crass et al. | 361/313 |
| 4,400,428 | 8/1983 | Rosenthal et al. | 428/349 |
| 4,419,411 | 12/1983 | Park | 428/516 |
| 4,502,263 | 3/1985 | Crass et al. | 53/396 |
| 4,659,612 | 4/1987 | Balloni et al. | 428/213 |
| 4,666,772 | 5/1987 | Schinkel et al. | 428/330 |
| 4,720,420 | 1/1988 | Crass et al. | 428/216 |
| 4,786,533 | 11/1988 | Crass et al. | 428/516 |
| 4,786,562 | 11/1988 | Kakugo et al. | 428/516 |

FOREIGN PATENT DOCUMENTS 3418282 11/1985 Fed. Rep. of Germany .
1586205 3/1981 United Kingdom .

*Primary Examiner*—P. C. Ives
*Attorney, Agent, or Firm*—Foley & Lardner, Schwartz, Jeffery, Schwaab, Mack, Blumenthal & Evans

[57] ABSTRACT

A biaxially stretch-oriented multilayer film is disclosed which is produced by coextrusion and is suitable as a release sheet in the production of decorative laminate panels having a matte surface finish. The film comprises a base layer essentially comprising polypropylene and at least one top layer. The top layer essentially comprises
(a) 98.5% to 99.6% by weight of a propylene homopolymer and
(b) 0.4% to 1.5% by weight of a polydiorganosiloxane, relative to the weight of the top layer.

14 Claims, 1 Drawing Sheet

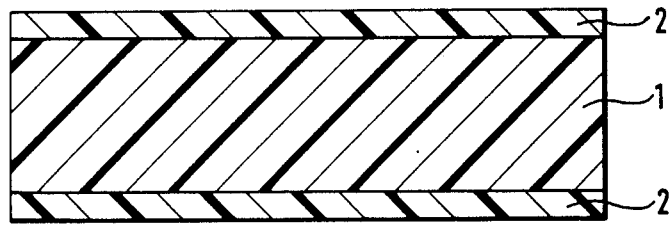

MULTILAYER FILM SUITABLE AS A RELEASE SHEET IN THE PRODUCTION OF DECORATIVE LAMINATE PANELS

BACKGROUND OF THE INVENTION

The present invention relates to a biaxially stretch-oriented multilayer film essentially comprising a propylene homopolymer, comprised of a highly pigmented base layer and a thin modified top layer applied to one or both of its surfaces. The invention also relates to the manufacture and use of the film.

Decorative laminate panels are widely used for producing furniture, e.g., kitchen and office furniture, but also for outdoors applications, e.g., as windowsills, etc. Special types are used under extremely severe conditions, e.g., in shower cubicles or bathrooms or as benches in chemical laboratories. The last mentioned applications, in particular, require panels which are extraordinarily resistant to scratches, to organic and aqueous solvents and to detergents. Apart from imparting a special optical appearance, the surface texture is of particular importance in respect to these characteristic features.

Laminate boards of the type described above have, for example, been disclosed by German Offenlegungsschrift No. 34 18 282. As a rule, the core layer of a laminate panel is comprised of a multilayer structure comprising a plurality of paper webs impregnated with a phenolic resin. A cellulose paper which is impregnated with a melamine resin and which may be unicolored or printed with a multicolored pattern, is usually applied to this core layer as a top layer.

Prior to the actual pressing of the top layer(s) and the core layer, the resin-impregnated papers of the core and top layers are dried and thereby partially condensed. The subsequent actual pressing is in general performed by means of heatable or coolable, automatically controlled multi-level pressing units where up to 40 laminate panels can be produced simultaneously. So-called high pressure laminates (H.P.L.) are compressed at pressures of between 70 and 100 bar and temperatures of between 140° and 160° C. During the compression, the resins flow and are cured, whereby a compact, non-meltable, rigid, crosslinked product is formed. Suitable presses include intermittently and continuously working units and through-feed units.

If a plurality of panels are stacked on top of one another in the presses, which is economically advantageous for low-thickness core layers, the individual panels must be separated by separators. To produce smooth surfaces, polished metal sheets having plane high-gloss surfaces are used as separators. If the laminate panels are to exhibit a textured or matte surface (for example, resembling veining or fabric texture), appropriately textured templates are required.

In order to prevent a sticking-together of the templates and resinous surfaces in those cases where textured templates are used, an additional release sheet must be inserted between the actual separator and the surface of the laminate. Apart from paper and aluminum foil, biaxially stretch-oriented polypropylene foil has been increasingly used for this purpose in recent times.

When clear (transparent) stretch-oriented polypropylene films are employed as release sheets, high-gloss surface finishes are obtained. If, however, matte surface finishes are desired, the manufacturers have to fall back on brushed aluminum foils. More recently, highly pigmented, biaxially stretch-oriented polyester films have also been employed. It is a common disadvantage of these two release films, which are used to produce matte or structured surfaces, that they are relatively expensive.

Attempts have been made to employ a highly pigmented, i.e., opaque, polyolefin film as a release film, instead of the expensive, highly pigmented polyester films. Polyolefin films of this type are, for example, described in German Offenlegungsschrift No. 28 14 311 (equivalent to U.S. Pat. No. 4,303,708). There is, however, the risk that the surfaces of the laminate panels stick to these release films.

SUMMARY OF THE INVENTION

It is therefore an object of the present invention to provide a release film suitable for the production of matte, textured laminate panels. It is a further object of the invention to provide a release film which is easily removed from the surfaces of the laminate panels after the pressing process, which exhibits a satisfactory roughness profile, and which is less expensive to produce than the production of the materials used so far.

These and other objects are accomplished by a coextruded biaxially stretch-oriented multilayer film which is suitable as release film in the production of decorative laminate panels having a matte surface texture. The film is comprised of a base layer essentially comprising polypropylene and of at least one top layer, wherein said top layer essentially contains (a) 98.5 to 99.6% by weight of a propylene polymer and (b) 0.4 to 1.5% by weight of a polydiorganosiloxane, wherein % by weight is with reference to the total weight of the top layer.

Surprisingly, it has been found that the multilayer film according to this invention both ensures the desired matte surface texture of the laminate panels, and can be easily removed from the latter after the pressing process.

BRIEF DESCRIPTION OF THE DRAWING

The single FIGURE is a cross-sectional view of the multilayer film of the present invention.

DETAILED DESCRIPTION OF THE PREFERRED EMBODIMENTS

The polypropylene of which the base layer and the top layer(s) are comprised in accordance with this invention is a homo- or copolymer (block copolymer or random copolymer) or propylene or a mixture of propylene homopolymers and/or propylene copolymers. The proportion of comonomers is up to 20% by weight, preferably up to 10% by weight, relative to the weight of the copolymer. Suitable comonomers include ethylene and $C_4$ to $C_6$-olefins, with ethylene being preferred. The polypropylene is preferably selected from among propylene homopolymers and propylene copolymers containing up to 10% by weight of ethylene as comonomers.

The proportion of polypropylene in the base layer varies between 70 and 97% by weight, preferably between 75 and 95% by weight, relative to the weight of the base layer. The top layer contains 98.5 to 99.6% by weight of polypropylene, relative to the weight of the top layer.

The melt index of the polypropylene of the base layer is within the range from 0.5 to 5 g/10 min, in particular from 1 to 3 g/10 min. The melt index of the polypropylene of the top layer(s) is within the range from 1.5 to 20 g/10 min, in particular from 3 to 10 g/10 min. It is preferred that the melt index of the base layer be inferior to that of the top layer(s). The melt indices are determined in accordance with DIN 53,735, at 230° C. and under a load of 2.16 kg.

In accordance with this invention, a high amount of fine particulate inorganic pigments is contained in the base layer. In particular, the amount of pigment varies between 3 and 30% by weight, more preferably between 5 and 25% by weight, relative to the weight of the base layer.

Barium sulfate, calcium carbonate, alkali metal silicate, aluminum silicate, alkali metal/aluminum silicate, silicon dioxide or titanium dioxide or mixtures of two or more of these pigments are preferably added to the base layer as inorganic pigments. Particular preference is given to silicon compounds of alkaline-earth metal carbonates. The mean particle size (mean particle diameter) of the pulverulent pigments is within the range of 1 to 10 μm, preferably of 1 to 4 μm.

According to the invention, the top layer applied to at least one surface of the base layer contains a small amount of a polydiorganosiloxane as an anti-adhesive agent. As a rule, the polydiorganosiloxane is a polydialkylsiloxane, with polydi($C_1$–$C_4$ alkylsiloxanes being preferred. Special preference is given to polydimethylsiloxane. The polydiorganosiloxane has a viscosity of at least 100 mm$^2$/s at 25° C., preferably of 1,000 to 100,000 mm$^2$/s, and particularly preferably of 20,000 to 50,000 mm$^2$/s. The proportion of polydiorganosiloxane contained in the top layer(s) preferably amounts to 0.6 to 1.2% by weight, relative to the weight of the top layer.

The peak-to-valley height $R_z$ of the surface of the top layer preferably is between 1.0 and 3.0 μm, determined in accordance with DIN 4,768. The surface roughness of, for example, propylene is usually adjusted during the film manufacture by thermally influencing the morphology of the polypropylene (β- -conversion of crystallites) systematically. Suitable processes are described in German Patents No. 27 40 237 (equivalent to British Patent No. 1,586,205) and No. 29 42 298 (equivalent to U.S. Pat. No. 4,367,511).

The total thickness of the release sheet of this invention can be varied within wide limits. In general, it is within the range from 20 to 60 μm, preferably from 25 to 50 μm. The anti-adhesive top layer has a thickness of 0.3 to 5 μm, in particular of 0.5 to 2.5 μm.

The release film according to this invention is produced by means of the known coextrusion process. In this process, the melts corresponding to the individual layers of the film are coextruded through a slot die, the coextruded film is solidified by cooling, the cooled film is biaxially stretch-oriented—the preferred stretch ratios being between 4 and 7 in the longitudinal direction and between 7 and 10 in the transverse direction—and finally the biaxially stretch-oriented film is heat-set. First, the compositions (molding materials) corresponding to the base layer and the two top layers are prepared by mixing the appropriate components. These compositions are liquefied in an extruder and compressed. The resulting melts are then simultaneously extruded through a slot die, and the extruded multilayer film is cooled and solidified while running over one or several rollers which are kept at a temperature of 30° to 50° C. by appropriate cooling means. Stretching in the longitudinal direction is preferably performed at a film temperature of 120° to 140° C., and stretching in the transverse direction is preferably performed at a film temperature of 160° to 180° C. The biaxial stretching is preferably carried out in two subsequent stages, first in the longitudinal direction and then in the transverse direction. Stretching in the longitudinal direction is expediently performed with the aid of two rollers rotating at different speeds, corresponding to the desired stretch ratio, and stretching in the transverse direction is preferably performed in an appropriate tenter frame equipped with clamps. The film is heat-set by heating it to a temperature between 150° and 160° C. for about 0.5 to 10 seconds.

The release film according to this invention, which is prepared by coextrusion, possesses at least one top layer and is oriented by biaxial stretching, represents a particularly advantageous release sheet film which is suited for numerous applications.

The following Example illustrates that, in contrast to the Comparative Examples, the release sheet according to the invention ensures a sufficiently uniform, matte surface finish of a laminate panel, and that it can be easily peeled off from the surface of the laminate after the pressing process, without damage.

The multilayer film of this invention can be used as a release sheet which produces matte surface finishes on laminate panels employed, for example, for the manufacture of kitchen furniture, laboratory equipment, etc.

The invention is illustrated in greater detail by the following Example and the attached drawing, but without being limited to these embodiments.

In the figure of drawings, reference numeral (1) designates the highly pigmented base layer and reference numeral (2) designates the siloxane-modified top layer.

EXAMPLE 1

Employing the coextrusion process, a three-layer polypropylene film comprising a base layer and two top layers was extruded through a slot die at a temperature of about 260° C. The melt for the base layer was comprised of 90% by weight of a propylene homopolymer having a melt index of 2.0 g/10 min, and of 10% by weight of $CaCO_3$ having a mean particle diameter of 2.8 μm, the percentages each time being related to the weight of the base layer. The melts for the two top layers were each time comprised of 99.2% by weight of a propylene homopolymer having a melt index of 3.5 g/10 min, and of 0.8% by weight of a polydimethylsiloxane having a viscosity of 25,000 mm$^2$/s at 25° C., the percentages each time being related to the weight of the respective top layer. The film was solidified on the take-off roller, then heated in a heating passage to the temperature required for stretching and thereafter stretched by a factor of 5 in the longitudinal direction at 125° C. and by a factor of 9 in the transverse direction at 165° C. The subsequent heat-setting treatment was performed at 160° C. for 5 seconds. The total thickness of the resulting multilayer film was 40 μm, and the thickness of each of the top layers was 2 μm.

The multilayer film was tested in a multilevel press where it was used as a release sheet between melamine laminate panels, under a pressure of 90 bar and at a temperature of 145° C.

The handling of the multilayer film as release sheet was easy, i.e., it could be peeled off from the laminate panel without difficulty, and the surface of the laminate exhibited the desired matte finish.

COMPARATIVE EXAMPLE 1

A three-layer film having a total thickness of 40 mm was prepared in accordance with European Patent Application No. 0,004,633 (equivalent to U.S. Pat. No. 4,303,708). The thicknesses of the individual layers chosen corresponded to those indicated in Example 1.

The handling of the film, when used as a release sheet, was unsatisfactory. After the pressing process, the film was completely stuck to the laminate panel, and therefore it was not possible to peel it completely from the surface of the panel. Moreover, the surface of the laminate panel did not exhibit a uniform matte finish.

COMPARATIVE EXAMPLE 2

By analogy with the process of the Example, a 40 μm thick monofilm was produced by extrusion. The content and type of the propylene homopolymer and the content and type of the pigment corresponded to the components of the base layer of the Example.

The monofilm was used as release sheet in the production of laminate panels, as described in the Example. The surfaces of the laminate panels exhibited an acceptable matte finish, but they were damaged by white deposits which caused inhomogeneities and pimples on the panel surfaces. Therefore, the panels were not suited for decorative purposes.

What is claimed is:

1. A biaxially stretch-oriented multilayer film produced by coextrusion and suitable as a release sheet in the production of decorative laminate panels having a matte surface finish comprising:
    a base layer comprising polypropylene and a fine-particulate pigment in an amount of from about 3% to 30% by weight, relative to the weight of the base layer, and
    at least one top layer, having a peak-to-valley height $R_z$ between about 1.0 to 3.0 μm, comprising:
    (a) from about 98.5 to 99.6% by weight of a propylene homopolymer and
    (b) from about 0.4 to 1.5% by weight of a polydiorganosiloxane, relative to the weight of said top layer.

2. A multilayer film as claimed in claim 1 wherein the melt index of the polypropylene used for the base layer is inferior to the melt index of the polypropylene used for the top layer.

3. A multilayer film as claimed in claim 2 wherein the polypropylene of the base layer has a melt index of from about 0.5 to 5 g/10 min and the top layer has a melt index of from about 1.5 to 20 g/10 min.

4. A multilayer film as claimed in claim 3 wherein the base layer has a melt index of from about 1 to 3 g/10 min.

5. A multilayer film as claimed in claim 4 wherein the top layer has a melt index of from about 3 to 10 g/10 min.

6. A multilayer film as claimed in claim 1 wherein the pigment in the base layer is present in an amount of from about 5% to 25% by weight, relative to the weight of the base layer.

7. A multilayer film as claimed in claim 6 wherein the pigment has a mean particle diameter of from about 0.5 to 10 μm.

8. A multilayer film as claimed in claim 1 wherein both surfaces of the base layer are provided with a top layer.

9. A multilayer film as claimed in claim 1 wherein the polydiorganosiloxane has a viscosity of from about 1,000 to 100,000 mm$^2$/s.

10. A multilayer film as claimed in claim 9 wherein the viscosity of the polydiorganosiloxane is from about 20,000 to 50,000 mm$^2$/s.

11. A multilayer film as claimed in claim 1 wherein the top layer comprises from about 0.6% to 1.2% by weight of the polydiorganosiloxane.

12. A multilayer film as claimed in claim 1 which has a total thickness of from about 20 to 60 μm, and a thickness of the top layer of from about 0.3 to 5 μm.

13. A multilayer film as claimed in claim 12 which has a thickness of the top layer of from about 0.5 to 2.5 μm.

14. A biaxially stretch-oriented multilayer film as claimed in claim 1 consisting essentially of:
    a base layer consisting essentially of polypropylene and a fine-particulate pigment in an amount of from about 3% to 30% by weight, relative to the weight of the base layer, and
    - at least one top laayer, having a peak-to-valley height $R_z$ between about 1.0 to 3.0 μm, consisting essentially of:
    (a) from about 98.5 to 99.6% by weight of a propylene homopolymer and
    (b) from about 0.4 to 1.5% by weight of a polydiorganosiloxane, relative to the weight of said top layer.

* * * * *